(12) United States Patent
Seo

(10) Patent No.: US 6,760,216 B2
(45) Date of Patent: Jul. 6, 2004

(54) PROTECTIVE COVER MOUNTING APPARATUS FOR A HERMETIC COMPRESSOR

(75) Inventor: Seung-don Seo, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 0 days.

(21) Appl. No.: 10/395,497

(22) Filed: Mar. 24, 2003

(65) Prior Publication Data

US 2004/0027790 A1 Feb. 12, 2004

(30) Foreign Application Priority Data

Aug. 9, 2002 (KR) .......................................... 2002-47007

(51) Int. Cl.[7] .......................... H02B 1/26; H01R 13/627
(52) U.S. Cl. ........................ 361/601; 361/622; 361/679; 248/510; 439/367
(58) Field of Search .................................. 361/600, 601, 361/622, 641, 679, 728; 24/458, 297, 453, 457, 625; 248/510; 257/706; 439/367

(56) References Cited

U.S. PATENT DOCUMENTS

| | | | | |
|---|---|---|---|---|
| 3,167,293 A | * | 1/1965 | Stenger et al. ........... | 248/309.1 |
| 4,319,299 A | * | 3/1982 | Woods et al. ............. | 361/24 |
| 4,467,385 A | * | 8/1984 | Bandoli et al. ........... | 361/24 |
| 4,493,144 A | * | 1/1985 | Woods et al. ............. | 29/622 |
| 4,840,547 A | * | 6/1989 | Fry ............................ | 417/422 |
| 4,966,559 A | * | 10/1990 | Wisner .................... | 439/566 |
| 4,998,035 A | * | 3/1991 | Jensen .................... | 310/91 |
| 5,170,307 A | * | 12/1992 | Nacewicz et al. ....... | 361/24 |
| 5,173,057 A | * | 12/1992 | Bunch et al. ............ | 439/217 |
| 5,199,898 A | * | 4/1993 | Wisner .................... | 439/367 |
| 5,336,105 A | * | 8/1994 | Wisner .................... | 439/367 |
| 5,448,449 A | * | 9/1995 | Bright et al. ............ | 361/704 |
| 5,486,981 A | * | 1/1996 | Blomquist ............... | 361/704 |
| 5,588,871 A | * | 12/1996 | Salvaneschi ............ | 439/469 |
| 5,761,036 A | * | 6/1998 | Hopfer et al. .......... | 361/704 |
| 6,049,963 A | * | 4/2000 | Boe ........................ | 29/525.01 |
| 6,317,304 B1 | * | 11/2001 | De Campos ........... | 361/22 |
| 6,392,323 B1 | * | 5/2002 | Parker .................... | 310/89 |
| 6,553,663 B2 | * | 4/2003 | Bunch et al. ........... | 29/857 |
| 6,557,625 B1 | * | 5/2003 | Ma ........................ | 165/80.2 |

FOREIGN PATENT DOCUMENTS

| | | | | |
|---|---|---|---|---|
| EP | 793068 A1 | * | 9/1997 | .......... F25D/29/00 |
| KR | 2001047060 A | * | 6/2001 | .......... F04B/39/12 |

* cited by examiner

Primary Examiner—Anatoly Vortman
(74) Attorney, Agent, or Firm—Ladas & Parry

(57) ABSTRACT

A protective cover mounting apparatus for a hermetic compressor for removably mounting a protective cover to protect electrical parts disposed on a terminal portion of a hermetic compressor casing comprises a pair of first protrusions respectively formed on two facing sides of the protective cover for protecting electrical parts disposed on a terminal portion of a hermetic compressor casing, a second protrusion formed on a side that is removed from the casing when the protective cover is mounted on the casing, a clamp pivotably disposed on the casing and including a pressing portion and a holding portion formed to correspond to the first and second protrusions. The protective cover can be easily mounted or separated since it is mounted or separated from the cover by simply pivoting the clamp until the holding portion is caught by the second protrusion and the protective cover can be firmly mounted on the casing as the pressing portion of the clamp presses the first protrusion of the protective cover towards the casing.

5 Claims, 6 Drawing Sheets

PROTECTIVE COVER MOUNTING APPARATUS FOR A HERMETIC COMPRESSOR

BACKGROUND OF THE INVENTION

1. Field of the Invention

The present invention relates generally to a hermetic compressor, and more particularly, to a protective cover mounting apparatus for removably mounting a protective cover to a casing for protecting electrical parts disposed in the casing of the compressor.

2. Background of the Related Art

Conventionally, a hermetic compressor is disposed in appliances such as a refrigerator and an air conditioner employing a refrigeration cycle for compressing a refrigerant, and comprises a motor, a refrigerant compression unit for compressing a refrigerant using the force generated by the motor, and a casing. The casing covers the motor and the refrigerant compression unit. Electrical parts such as a relay and an overload protector for supplying power to the motor and controlling the rotation of the motor are disposed on the terminal portion outside the casing.

FIG. 1 shows an external part of the hermetic compressor 100 having the above-described structure. As shown, the hermetic compressor 100 comprises a casing 110, electrical parts 140, a protective cover 150, and a clamp 160. The electrical parts 140 include a relay 141 and an overload protector 143, and are disposed on the terminal portion 120 provided on the casing and connected to the terminal 125. The electrical parts 140 are connected to the external power through a cable (not shown).

The protective cover 150 protects the electrical parts 140 from external impulses and determinants by covering the electrical parts 140. The protective cover 150 has an inner space (not shown) and an opening for receiving the electrical parts 140.

On the outer circumference of the casing 110, a bracket 130 is formed alongside the outer border of the terminal portion 120. The bracket 130 is utilized for fixing the protective cover 150 to the casing 110 and has symmetrically aligned holes 131 on opposed ends of the bracket 130. The opposed arms of the clamp 160 are flexibly hooked in the holes 131 while the clamp 160 is mounted on the protective cover.

According to the conventional compressor 100 having the above-described structure, it is possible to removably mount the protective cover 150 on the casing 110 by hooking the clamp 160 in the bracket 130. However, it may be inconvenient to hook opposed ends of the clamp 160 in the symmetrically aligned holes 131 on the bracket 130 by the resilience of the clamp 160 itself. Moreover, when the protective cover 150 needs to be separated from the casing 110 for repairing or replacement of the electrical parts 140, it may not be easy to unhook the clamp 160 from the bracket 130.

SUMMARY OF THE INVENTION

An object of the invention is to solve at least the above-identified problems and/or disadvantages and to provide at least the advantages described hereinafter.

Accordingly, one object of the present invention is to solve the foregoing problems by providing a protective cover mounting apparatus for a hermetic compressor which is improved for facile mounting and separating the protective cover requiring less strength, and also for firmly mounting the protective cover on the casing.

The foregoing and other objects and advantages are realized by providing a protective cover mounting apparatus for a hermetic compressor comprising a first protrusion formed on at least one facing side of the protective cover for protecting electrical parts disposed on a terminal portion of a hermetic compressor casing, a second protrusion formed on an outer surface of the protective cover, a clamp pivotably disposed on the casing and including a pressing portion and a holding portion formed to correspond to the first and second protrusions.

Accordingly, the protective cover can be easily mounted or separated since it is mounted or separated from the cover by simply pivoting the clamp, and the protective cover can be firmly mounted on the casing as the pressing portion of the clamp presses the first protrusion of the protective cover towards the casing.

According to the preferred embodiment of the present invention, it is preferable that the clamp comprises a clamp body with both ends being hinged on holes formed on the casing near the terminal portion, and the clamp body is formed of a resilient material and the pressing portion and the holding portion are formed by parts of the clamp body that are bent.

In addition, it is preferable that a part of the holding portion is further bent to form a handle, and the handle is formed to protrude outwardly past the outer end of the second protrusion when the holding portion is caught by the second protrusion during mounting.

Meanwhile, the protective cover mounting apparatus for the hermetic compressor according to another embodiment of the present invention may also be applied in the case of the electrical parts and the protective cover being integral.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
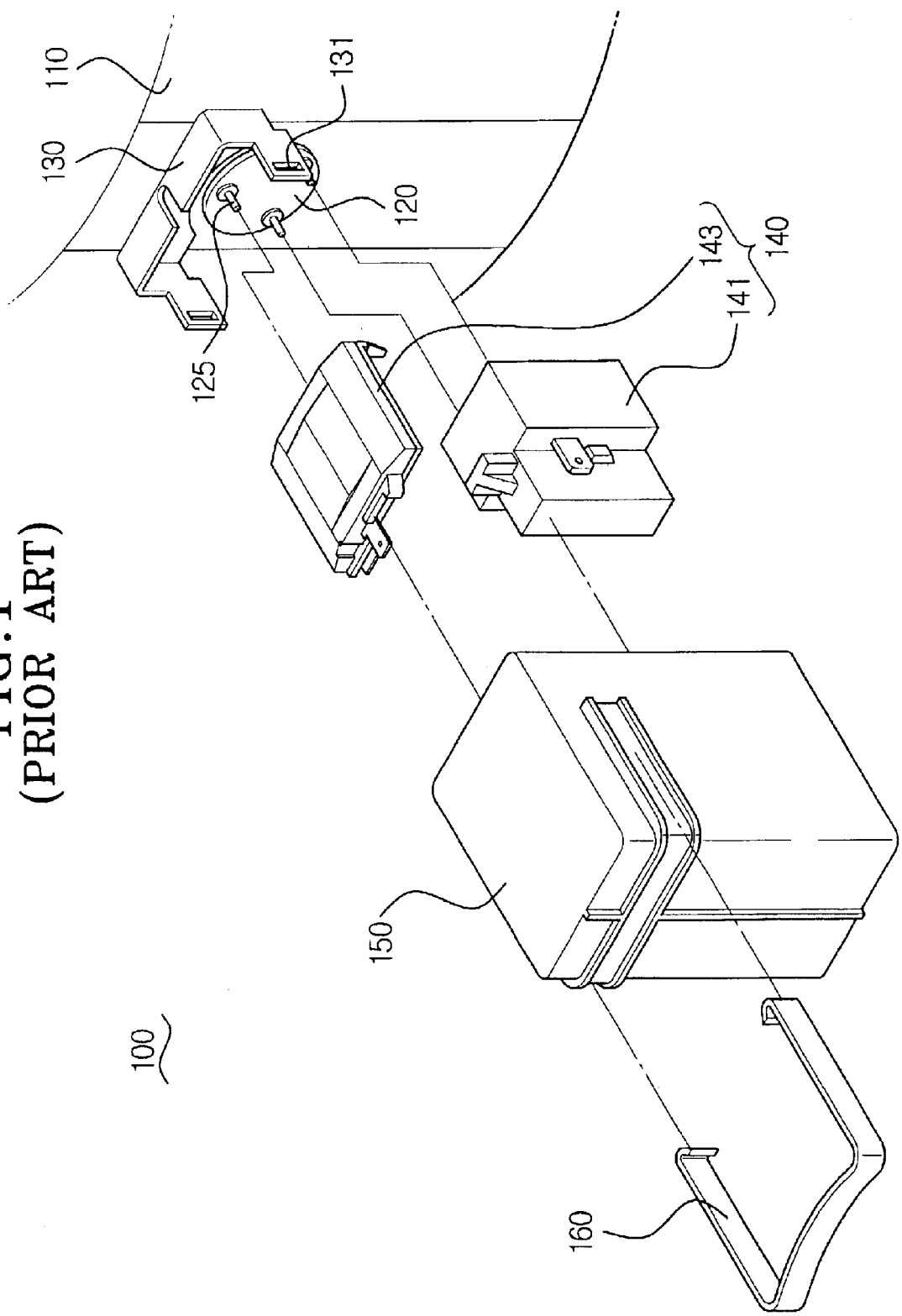
FIG. 1 is an exploded perspective view showing a conventional hermetic compressor.

The following detailed description will describe a protective cover mounting apparatus for a hermetic compressor according to a preferred embodiment of the invention having reference to the accompanying drawings. With respect to the elements identical to those of the conventional hermetic compressor shown in FIG. 1, like reference numerals will be assigned and the detailed description thereof will be omitted.

Figure 2:
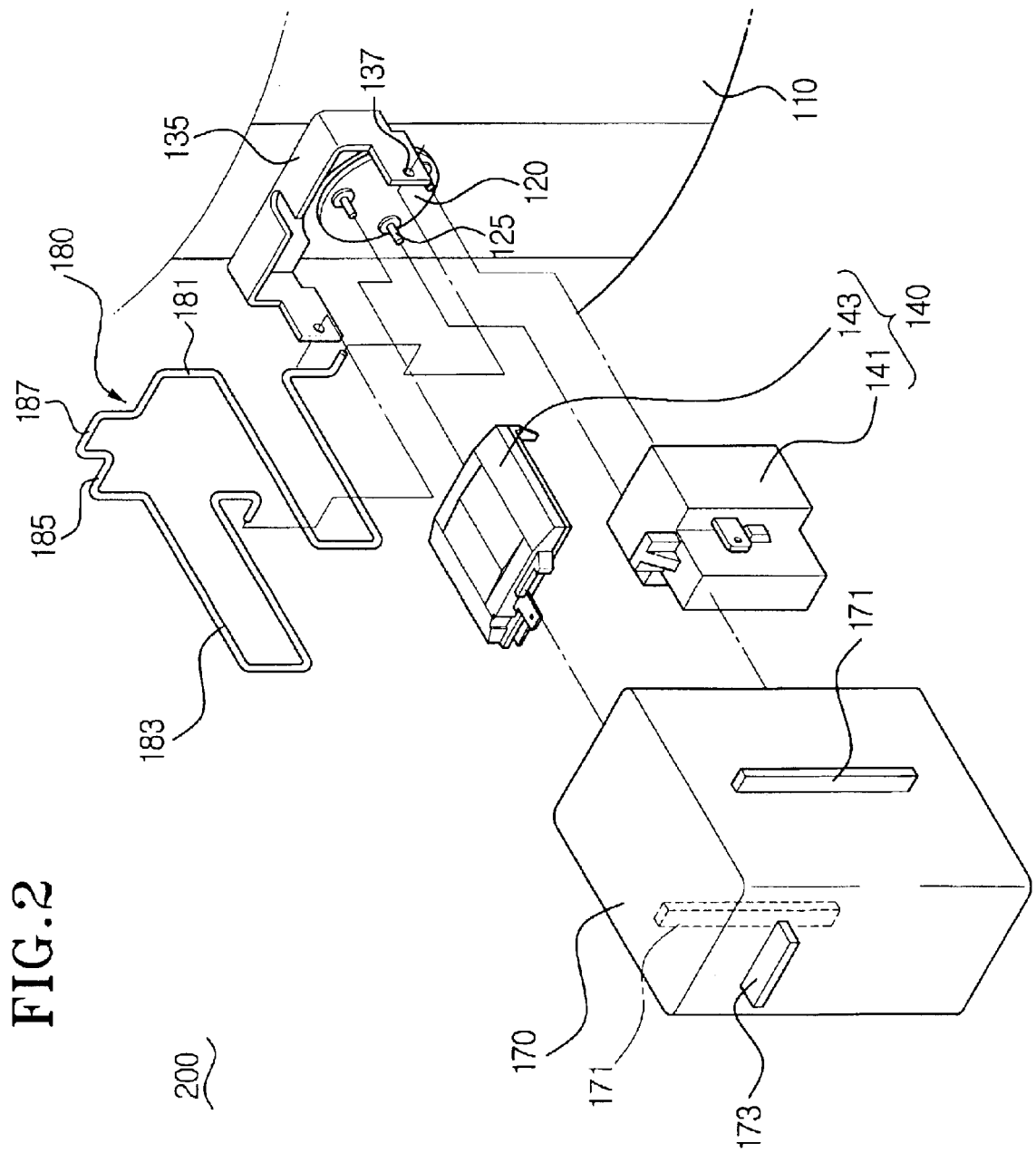
FIG. 2 is an exploded perspective view showing a hermetic compressor with the protective cover mounting apparatus according to the embodiment of the present invention.
Figure 3:
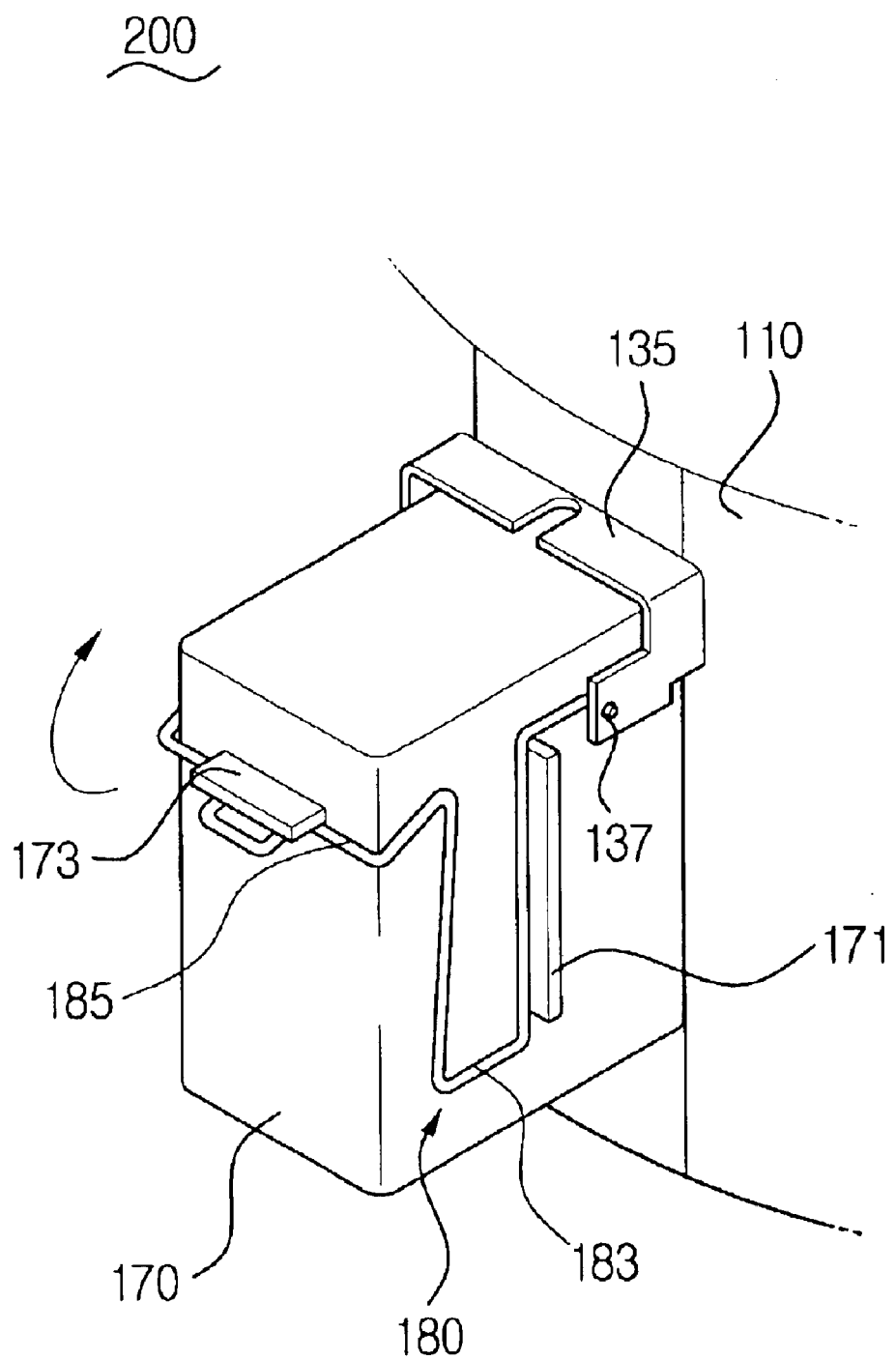
FIG. 3 is a perspective view showing a hermetic compressor with a protective cover mounting apparatus according to an embodiment of the present invention shown in FIG. 2.

FIGS. 2 and 3 show a hermetic compressor 200 according to one embodiment of the present invention. The hermetic compressor 200 in the above drawings includes a casing 110 having a motor (not shown) and a refrigerant compression unit (not shown), electrical parts 140 disposed on the casing 110, a protective cover 170 disposed on the casing 110 for covering the electrical parts 140, and a protective cover mounting apparatus for removably mounting the protective cover 170 on the casing 110.

A terminal portion 120 having a plurality of terminals 125 is formed on the casing 110. The terminals 125 are electrically connected with the motor disposed inside the casing 110. The electrical parts 140 including the relay 141 and overload protector 143 are mounted on the terminal portion 120. Although an example of the electrical parts 140 comprising the relay 141 and the overload protector 143 is described in the embodiment, the type and number of the electrical parts 140 and the mounting format may vary depending on the type of the compressor 200.

The protective cover 170 is removably mounted on the casing 110 to cover and protect the electrical parts 140 disposed on the terminal portion 120.

The hermetic compressor 200 comprises a protective cover mounting apparatus having a clamp 180 hinged on a bracket 135 mounted on the casing 110, the bracket 135, and first and second protrusions 171, 173 for removably mounting the protective cover 170 on the casing 110.

The clamp 180 comprises a clamp body 181, a holding portion 185, and a pressing portion 183.

The clamp body 181 is resilient to a certain extent and some parts of the clamp body 181 are bent to surround the protective cover 170 when disposed thereon. Both ends of the clamp body 181 are hinged on the symmetrically aligned holes 137 formed on the opposed arms of bracket 135 mounted on the casing 110 near the terminal portion 120. Accordingly, the clamp body 181 is pivotably disposed on the casing 110. The clamp 180 has a predetermined thickness and elasticity to provide for easy handling to provide for mounting and separating the protective cover 170 from the casing 110.

The first and second protrusions 171, 173 are formed on the protective cover 170. The first protrusion 171 are formed on the outer surface of the two facing sides of the protective cover 170, and the second protrusion 173 is formed on the outer surface of the side that is most far from the casing when the protective cover is mounted.

The pressing portion 183 and the holding portion 185 are formed on the clamp 180 for respectively corresponding to the first and second protrusions 171, 173. The pressing portion 183 presses the first protrusions 171 towards the casing 110 as the clamp 180 pivots for mounting the protective cover 170. The holding portion 185 is formed on the clamp body 181 so as to be caught underneath the second protrusion 173 when the clamp 180 pivots for mounting the protective cover 170. Here, it is preferable that the first protrusions 171 and the pressing portion 183 are formed to prevent the protective cover 170 mounted on the casing 110 from being pushed in the direction shown by the arrow in FIG. 3 by the holding portion 185 in contact with the second protrusion 173. The pressing portion 183 and the holding portion 185 in the present embodiment are formed by partially bending the clamp body 181.

The clamp 180 includes a handle 187 formed by bending the center of the holding portion 185 so as to protrude therefrom. As shown in FIG. 2, it is preferable that the end of the handle be formed to protrude outwardly past the outer end of the second protrusion 173 when the holding portion 185 is caught under the second protrusion 173.

The clamp 180 is not limited to the above embodiment. In order words, the holding portion 185 and the pressing portion 183 formed by bending the steel wire clamp body 181 may be formed in various shapes corresponding to the shape and location of the first and second protrusions formed on the protective cover 170. The pressing portion 183 and the holding portion 185 may also be formed by attaching separate members (not shown) to the clamp body 180, instead of bending the clamp body 181. Moreover, the clamp 180 may be disposed to pivot transversely unlike the clamp 180, shown as pivoting vertically in the present embodiment, and in that case, the first and the second protrusions 171, 173 of the protective cover may perform the same functions as long as they are formed to correspond to the pressing portion and the holding portion (not shown) of this alternative arrangement.

Hereinafter, a method for mounting a protective cover and electrical parts of the hermetic compressor according to an embodiment of the present invention.

As shown in FIG. 2, the clamp body 181 is hinged on the bracket 135 for the handle 187 to be placed above the compressor 200 and then the electrical parts 140 such as the relay 141 and the overload protector 143 are disposed on the terminal 125 of the terminal portion 120. The electrical parts 140 and the clamp 180 may be disposed in the opposite order.

Figure 4:
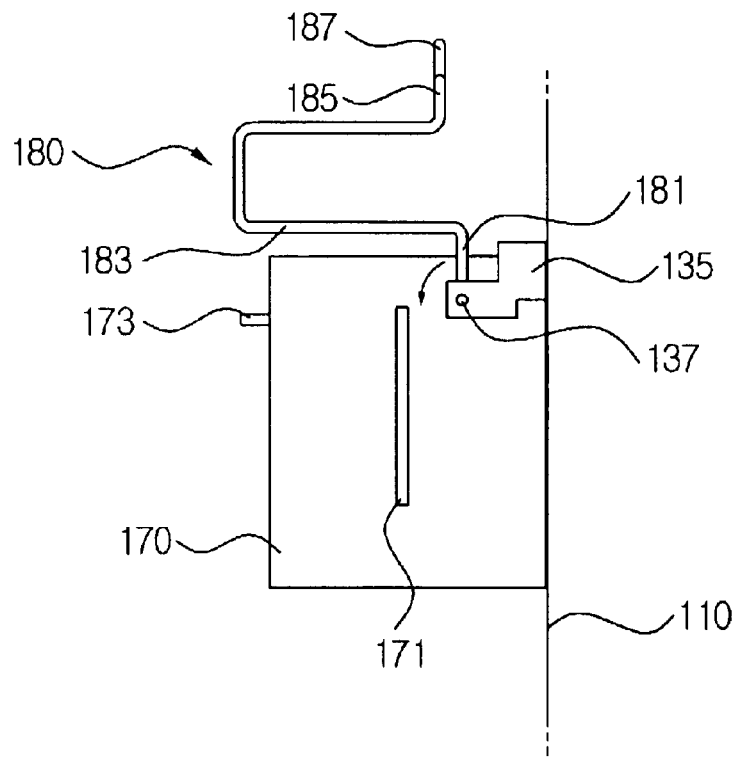
FIGS. 4 through 7 are side views showing the protective cover mounting apparatus according to the embodiment of the present invention during use.

After mounting the clamp 180 and the electrical parts 140 to the casing 110 as described, the electrical parts 140 are covered by the protective cover 170 and they will look as shown in FIG. 4.

After the protective cover 170 is mounted on the casing 110 to cover the electrical parts 140, the clamp 180 is pivoted in the direction indicated by an arrow in FIG. 4. The clamp 180 is pivoted until the pressing portion 183 contacts the first protrusions 171 and the clamp 180 cannot no longer pivot downward.

Figure 5:
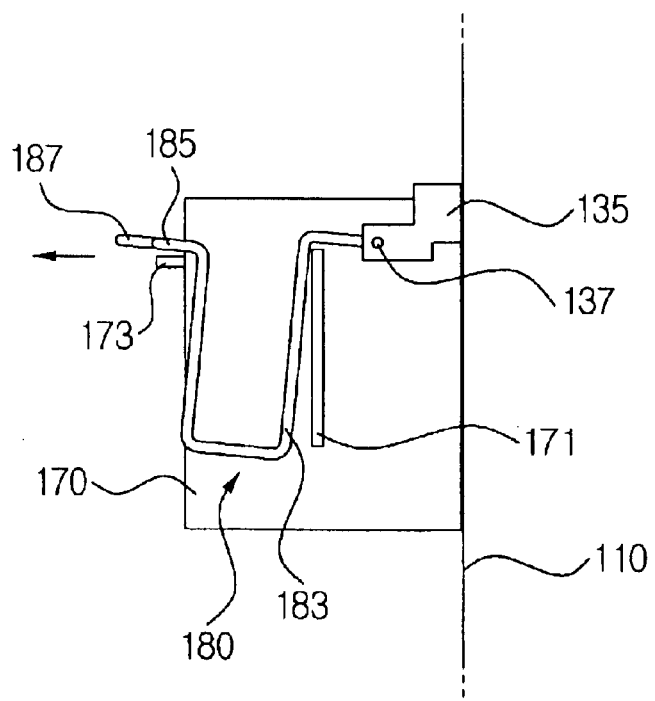

If the clamp 180 ceases to pivot as the pressing portion 183 contacts the first protrusion 171, continued downward force causes the handle 187 of the clamp 180 to be pulled in the direction indicated by an arrow in FIG. 5 until the handle 187 and the end of the holding portion 185 are located past the outer end of the second protrusion 173.

Figure 6:
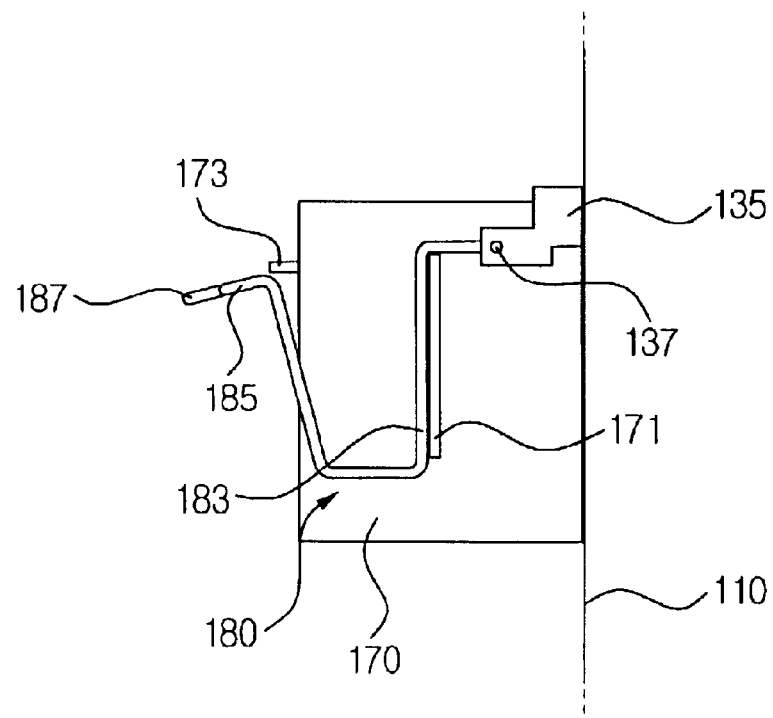

As shown in FIG. 6, when the handle 187 is being pulled outwardly, a part of the clamp body 181 is deformed into a certain shape, as the clamp body 181 relies on its resilient force. Such resilient force is transferred mostly to the pressing portion 183, which is in contact with the first protrusions 171, and the first protrusions 171 are pressed toward the casing 110 by the pressing portion 183.

Figure 7:
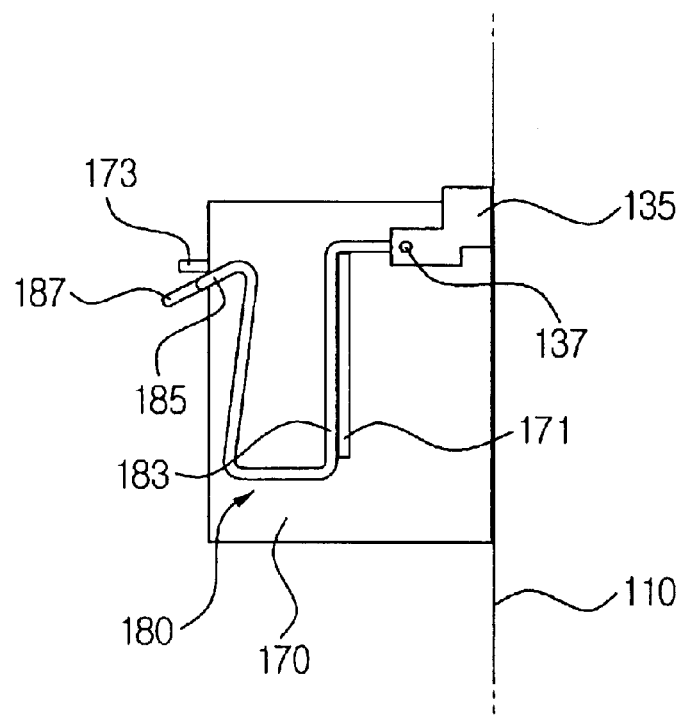

When the holding portion 185 is positioned past the outer end of the second protrusion 173, clamp 180 is pivoted downward a bit more until the holding portion 185 is located under the second protrusion 173 as shown in FIG. 6 and the downward pressure on the handle 187 is released. When the handle 187 is released, the holding portion 185 springs back to contact the bottom of the second protrusion 173 by the resilient force of the clamp body 181 as shown in FIG. 7.

As the first and second protrusions 171, 173 are pressed towards the casing 110 respectively by the resilient force of the pressing portion 183 and the holding portion 185 of the clamp 180, the protective cover 170 can be mounted on the casing 110. Such protective cover 170 mounting method enables easy mounting and separating of the compressor 200 as only the clamp 180 needs to be pivoted after positioning the protective cover 170 on the casing 110.

A detailed description of the method for separating the protective cover 170 from the casing 110 is omitted since it is similar to the mounting method, but is performed in the opposite order.

Figure 8:
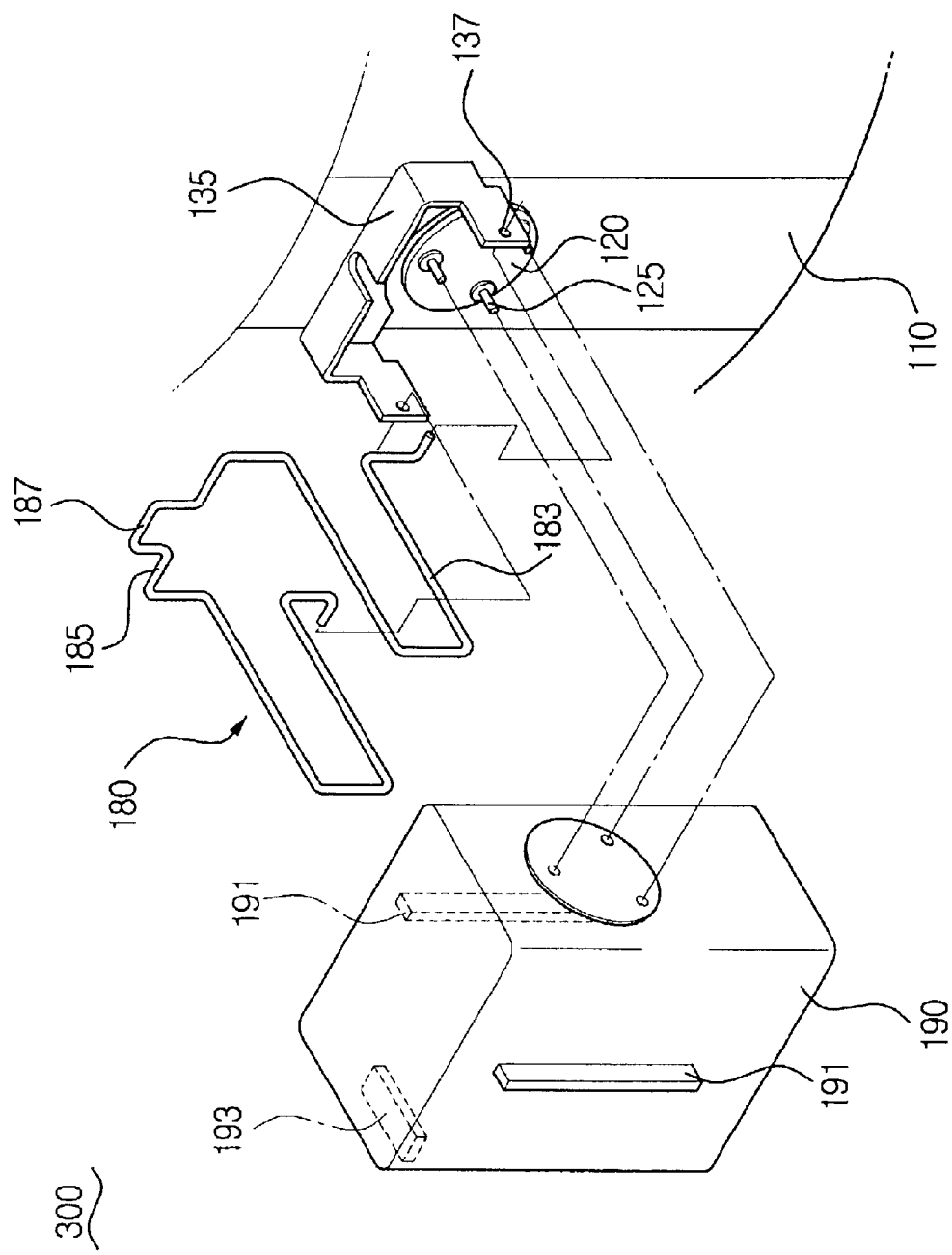
FIG. 8 is an exploded perspective view showing a hermetic compressor according to another embodiment of the present invention.

FIG. 8 shows a hermetic compressor 300 according to another embodiment of the present invention.

Mounted on the casing 110 of the hermetic compressor 200, according to this embodiment, are the protective cover 170 of the above-described previous embodiment and another type of electric part 190, including the relay 140 and the overload protector 143 integrally and internally disposed. However, in such case, the electrical part 190 can be removably mounted on the casing 110 by the same method described in the previous embodiment if the first and second protrusions 191, 193 are formed on the electrical part 190, and the pressing portion 183 and the holding portion 185 are formed on the clamp 180 for pressing the first and second protrusions 191, 193, respectively.

According to the present invention, the protective cover 170 (FIG. 3) or the integral electrical part 190 FIG. 8 can be easily mounted on the casing 110 by simple handling of the clamp 180 that can be pivoted on the casing 110.

Moreover, since the pressing portion 183 of the clamp 180 can further press the first protrusions 171, 191 of the protective cover 170 in a direction towards the casing 110 when the protective cover 170 is completely mounted by downwardly pivoting the clamp 180, the protective cover 170 can be firmly mounted on the casing 110.

The foregoing embodiments and advantages are merely exemplary and are not to be construed as limiting the present invention. The present teaching can be readily applied to other types of apparatus. The description of the present invention is intended to be illustrative, and not to limit the scope of the claims. Many alternatives, modifications, and variations will become apparent to those skilled in the art from an understanding of the present invention.

What is claimed is:

1. A protective cover mounting apparatus for a hermetic compressor for removably mounting a protective cover to protect electrical parts disposed on a terminal portion of a hermetic compressor casing, the protective cover mounting apparatus comprising:

a first protrusion formed on at least a first side of the protective cover;

a second protrusion formed on an outer surface of the protective cover;

a clamp pivotably disposed on the casing and including a pressing portion and a holding portion formed to correspond to the first and second protrusions;

wherein during mounting, the first protrusion is pressed towards the casing by the pressing portion when the protective cover is mounted on the casing as the clamp pivots until the holding portion is caught by the second protrusion.

2. The protective cover mounting apparatus of the hermetic compressor according to claim 1, wherein the clamp comprises a clamp body with both ends being hinged on holes formed on the casing near the terminal portion, and the clamp body is formed of a resilient material and the pressing portion and the holding portion are formed by parts of the clamp body that are bent.

3. The protective cover mounting apparatus of the hermetic compressor according to claim 2, wherein a part of the holding portion is bent to form a handle, and the end of the handle is formed so as to protrude outwardly past outer end of the second protrusion when the holding portion is caught by the second protrusion during mounting.

4. The protective cover mounting apparatus of the hermetic compressor according to claim 3, wherein the first side comprises two sides of the protective cover facing each other with the electrical parts in the middle when the protective cover is mounted, and the first protrusion is formed on the two sides of the protective cover, respectively.

5. The protective cover mounting apparatus of the hermetic compressor according to claim 1, wherein the electrical parts and the protective cover are integral.

* * * * *